United States Patent
McAleer

(10) Patent No.: US 9,690,576 B2
(45) Date of Patent: Jun. 27, 2017

(54) SELECTIVE DATA COLLECTION USING A MANAGEMENT SYSTEM

(71) Applicant: Dell Software, Inc., Round Rock, TX (US)

(72) Inventor: David McAleer, Toronto (CA)

(73) Assignee: Dell Software, Inc., Round Rock, TX (US)

( * ) Notice: Subject to any disclaimer, the term of this patent is extended or adjusted under 35 U.S.C. 154(b) by 77 days.

(21) Appl. No.: 14/619,853

(22) Filed: Feb. 11, 2015

(65) Prior Publication Data

US 2016/0234108 A1    Aug. 11, 2016

(51) Int. Cl.
*G06F 9/00* (2006.01)
*H04L 12/24* (2006.01)

(52) U.S. Cl.
CPC ............ *G06F 9/00* (2013.01); *H04L 41/0645* (2013.01); *H04L 41/0677* (2013.01); *H04L 41/0853* (2013.01)

(58) Field of Classification Search
None
See application file for complete search history.

(56) References Cited

U.S. PATENT DOCUMENTS

| | | | | |
|---|---|---|---|---|
| 5,261,044 A * | 11/1993 | Dev | .................... | G06F 11/2257 709/223 |
| 5,295,244 A * | 3/1994 | Dev | .................... | G06F 11/2257 709/223 |
| 5,504,921 A * | 4/1996 | Dev | .................... | G06F 11/2257 707/999.01 |
| 5,559,955 A * | 9/1996 | Dev | .................... | G06F 11/2257 714/4.12 |
| 8,595,625 B2 * | 11/2013 | Hung | .................. | H04L 41/0846 709/220 |
| 2002/0073199 A1 * | 6/2002 | Levine | .............. | H04L 29/12066 709/225 |
| 2002/0078237 A1 * | 6/2002 | Leighton | ............. | H04L 12/2697 709/239 |
| 2006/0218612 A1 * | 9/2006 | Johnson | .............. | H04L 43/0817 725/107 |
| 2009/0094521 A1 * | 4/2009 | Hung | ..................... | H04L 41/22 715/736 |

(Continued)

*Primary Examiner* — Ayaz Sheikh
*Assistant Examiner* — Faiyazkhan Ghafoerkhan
(74) *Attorney, Agent, or Firm* — Campbell Stephenson LLP; Shiv S. Naimpally

(57) ABSTRACT

A management system sends a first request for first data associated with multiple network entities. If the first request times out, the first request is split to create multiple smaller requests and the multiple smaller requests sent, requesting data from a subset of the multiple network entities. Based on responses to the multiple smaller requests, the management system identifies a particular network entity that caused the first request to time out and adds the particular network entity to a set of problematic entities. The management system sends a second request that requests second data from a portion of the multiple network entities that excludes the particular network entity. The multiple network entities may include one or more of a virtual machine (VM), a host node (to host VMs), a storage device, a network link, another type of network entity, or any combination thereof.

20 Claims, 4 Drawing Sheets

(56) References Cited

U.S. PATENT DOCUMENTS

| | | | | |
|---|---|---|---|---|
| 2009/0271514 A1* | 10/2009 | Thomas | G06F 11/3438 | 709/224 |
| 2009/0278708 A1* | 11/2009 | Kelley | G01D 4/002 | 340/870.39 |
| 2009/0300702 A1* | 12/2009 | Johnson | H04L 43/0811 | 725/129 |
| 2011/0019569 A1* | 1/2011 | Venkateswaran | H04L 12/2697 | 370/252 |
| 2011/0060829 A1* | 3/2011 | Pithawala | H04L 29/08846 | 709/224 |
| 2011/0238817 A1* | 9/2011 | Okita | H04L 41/142 | 709/224 |
| 2013/0077621 A1* | 3/2013 | Jacob Da Silva | H04L 45/58 | 370/355 |
| 2013/0219212 A1* | 8/2013 | Terada | G06F 11/3034 | 714/6.21 |
| 2013/0325895 A1* | 12/2013 | Peters | G06F 11/1076 | 707/769 |
| 2014/0304553 A1* | 10/2014 | Gondi | G06F 11/0751 | 714/39 |
| 2014/0310418 A1* | 10/2014 | Sorenson, III | H04L 67/1002 | 709/226 |
| 2014/0317622 A1* | 10/2014 | Hegdal | G06F 11/0712 | 718/1 |
| 2015/0163170 A1* | 6/2015 | Birrittella | H04L 69/22 | 370/419 |
| 2015/0170037 A1* | 6/2015 | Lvin | G06N 5/04 | 706/52 |
| 2015/0331777 A1* | 11/2015 | Lvin | H04L 41/065 | 707/694 |
| 2016/0077935 A1* | 3/2016 | Zheng | G06F 11/2028 | 714/4.12 |

* cited by examiner

SELECTIVE DATA COLLECTION USING A MANAGEMENT SYSTEM

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A management system may be used to manage and create reports associated with a large network of servers in which individual servers host multiple virtual machines (VMs). The management system may periodically send requests to nodes (e.g., the servers and the VMs) in the network, receive data from the nodes, and display a status of the network based on the data. However, a problem with a host (e.g., software crash, hardware failure, or the like), a problem with a portion of the network (e.g., due to router failure, transmission problem, etc.), or another type of problem may result in some nodes not providing data. Such problems may cause the management system to display stale data or generate reports that include stale data.

SUMMARY

This Summary provides a simplified form of concepts that are further described below in the Detailed Description. This Summary is not intended to identify key or essential features and should therefore not be used for determining or limiting the scope of the claimed subject matter.

A management system sends a first request for first data. The first data is associated with a plurality of network entities. If the first request times out or reports a problem with a network entity, the management system splits the first request to create a plurality of smaller requests and sends the plurality of smaller requests. Individual requests of the plurality of smaller requests are for data from a subset of the plurality of network entities. Based on responses to the plurality of smaller requests, the management system identifies a particular network entity of the plurality of network entities that caused the first request to (or report an problem) out and adds the particular network entity to a set of confirmed as problematic entities (e.g., a set of blacklisted entities). The management system sends a second request that requests second data from a portion of the plurality of network entities that excludes the particular network entity. The plurality of network entities may include one or more of a virtual machine (VM), a host node that can host (e.g., execute) VMs, a storage device, a network link, or a sub-network that may include any combination of VMs, host nodes, storage devices, or network links.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
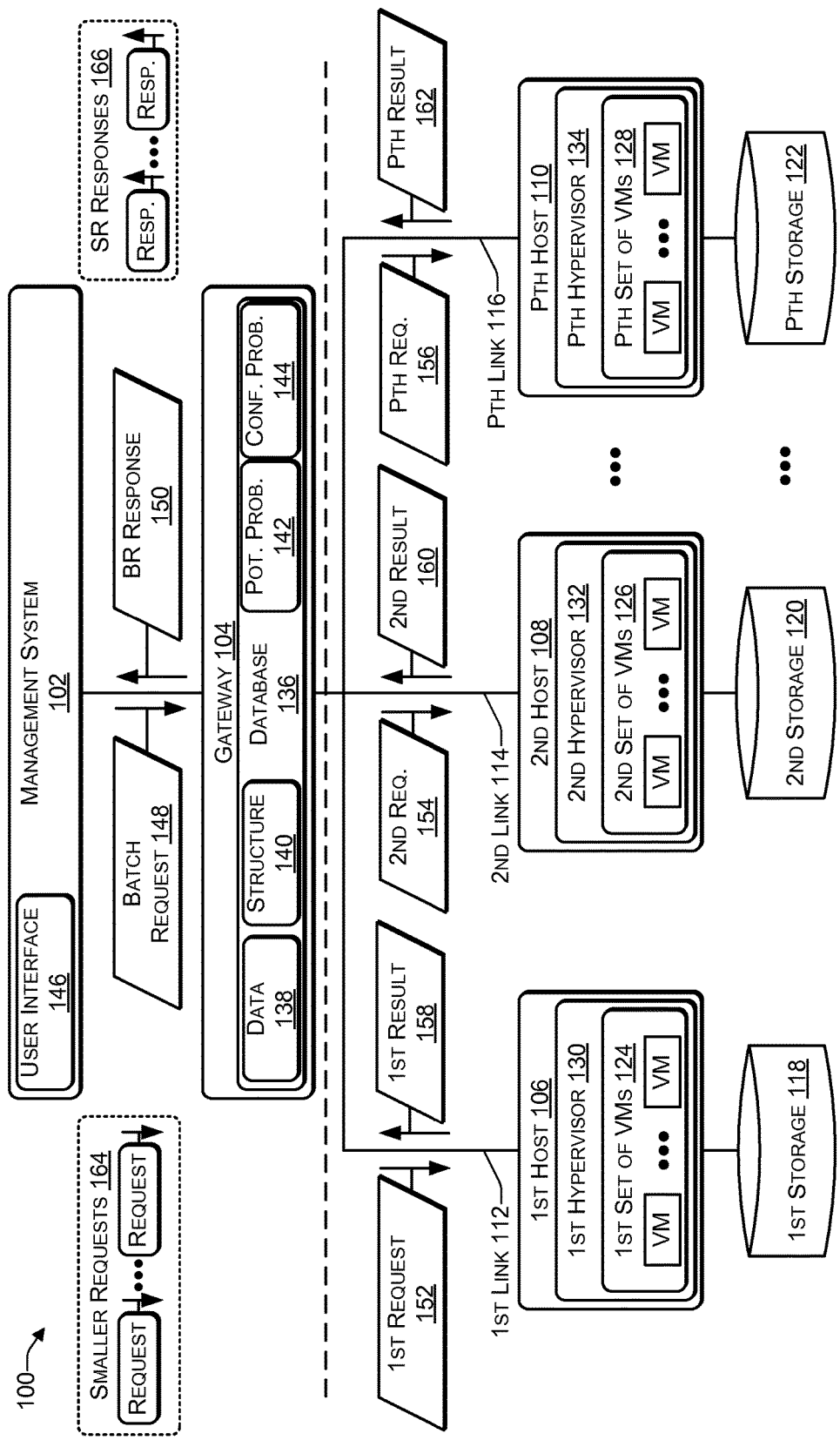
FIG. 1 is a block diagram illustrating an architecture that includes a management system to manage a network according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Systems and techniques are described herein for efficiently gathering data from entities (e.g., virtual machines (VMs), host nodes, network links, storage devices, etc.) in a network. For example, a management system may send a batch request for data to a gateway device. The batch request may identify the individual entities from which to request data. The gateway device may send data requests to the entities identified in the batch request. For example, the gateway device may send queries to individual entities or groups of entities in the network based on the entities identified in the batch request. The gateway device may wait to receive a response from the entities from which data has been requested to provide an aggregate response to the batch request. If a network entity has a problem (e.g., software error, hardware problem, etc.) then the network entity may not respond to the data request from the gateway, causing the aggregate response from the gateway to the management system to be delayed. A network entity may comprise a virtual machine (VM), a host node that can host (e.g., execute) VMs, a storage device, a network link, a sub-network, another type of network entity or any combination thereof. For example, a sub-network may include one or more of a VM, a host node, a storage node, or a network link. If the aggregate response is not received by the management system within a predetermined time from when the batch request was sent, the management system may consider the batch request to have timed out. The response to the request may identify one or more problems (e.g., an error message, an error report, an error log, etc. that indicates a problem when communicating with a sub-network, as host, a network link, a storage device, a VM, etc). The management system may repeatedly break the batch request into smaller requests (e.g., requesting data from a smaller set of entities) until the network entity that is not responding to data requests (or causing a problem to be reported in a response) is identified. The management system identifies the network entity as potentially problematic. For a subsequent batch request for which the management system identifies the network entity as potentially problematic, the management system increments a counter associated with the network entity. If the counter satisfies a predetermined threshold, the management system adds the network entity to a set of confirmed problematic entities (e.g., a blacklist). The management system may exclude confirmed problematic entities from batch requests. In this way, the batch requests may not time out (or report a problem) because the network entities (e.g., confirmed problematic entities) that are causing the aggregate response to time out (or causing a problem to be reported in a response) are not sent data requests. At periodic intervals, the management system may retry confirmed problematic entities by including one or more of the confirmed problematic entities in a batch request. If the batch request does not time out (or the response does not identify a problem), the one or more confirmed problematic entities are removed from the set of confirmed problematic entities and are included in subsequent batch requests.

A management system may collect and display management data to users, such as system administrators, associated with a large network of nodes. As used herein, the term node refers to both physical servers (e.g., host devices) as well as virtual machines (VMs) hosted by the physical servers. The management data may include configuration data, inventory data, performance data, and other types of data associated with nodes in the network. The management data may be collected at regular time intervals (e.g., every 5 minutes, every 10 minutes, every 15 minutes or the like).

The management system may provide an interface (e.g., a gateway) for other systems to access the data that the management system has collected. The interface enables other systems to provide different views of the data, aggregate the data at different levels, provide different types of perspectives of the network, etc. For example, the interface may enable other systems to request a particular set of data regarding a particular set of nodes along with a timestamp indicating when the data was gathered. To reduce network bandwidth, the interface may combine multiple requests into a single batch request. The interface may store the data received in response to a batch request in a database to enable the management system to access and display different perspectives of the data.

If the management system requests particular data and the particular data in the database is stale (e.g., older than a predetermined time interval) or does not exist in the database, the management system may request the interface to send a batch request for the data to a portion of the nodes in the network. The interface may store the resulting data in the database, and provide the results to the management system. However, problems, such as problems with a host or problems with a network link, may cause delays in the interface receiving the data, thereby causing a delay in the management system displaying the data.

For example, a management system, such as Foglight™ for Virtualization Enterprise (FVE), may collect management data from thousands of nodes and provide updates regarding the status of the network via a dashboard and reports. At scheduled collection intervals (e.g., five minutes, ten minutes, or the like) the management system requests data for a batch of nodes for the past time interval. However, if data in the database for the requested time interval is missing for a particular node, the entire batch may incur delays while waiting for the missing data to arrive. In a large network with tens of thousands of nodes, a delay in even one node responding to a request for data may cause data collection for thousands of nodes to take longer than the scheduled collection interval, causing the next collection interval to be delayed or skipped. Additionally, the batch request may be requesting data from an invalid node, for an invalid data item, etc., thereby causing the entire batch request to fail.

The management system creates one or more batch requests for multiple nodes that request the data and timestamp information used to manage the network. A thread pool or other technique may be used to send the multiple batch requests to the multiple nodes. A batch request is configured to time out after a configurable amount of time (e.g., 10 seconds, 20 seconds, 30 seconds, 40 second, or the like). For example, a default time out may be 30 seconds.

When a problem (e.g., a problem node, a wrong data item, a network error, etc.) occurs, the problem may be identified in a response to a batch request, or the batch request may time out. For example, the batch request may time out if at least one of the entities from which data was requested has not responded within a predetermined period of time. In such situations (e.g., the batch request has timed out or the response has identified problems), the batch request is split into N smaller requests (where N>1), and the smaller requests are added to the request pool serviced by the thread pool. The smaller request enables the management system to retry for a smaller set of nodes for which data may be available. When a problem occurs, the management system may keep splitting batch requests until a single element (e.g., a node, a network link, etc.) that is causing the problem is identified. The management system may mark the entity that is identified as causing the problem. If the problem reoccurs and the entity is again identified as causing the problem, the management system may keep track of how many times the entity is identified as causing the problem and then eventually confirm that the entity is problematic. The management system may not request data from entities that have been confirmed problematic to enable prevent future data requests from timing out. For example, if a problem occurs 8 times and a particular host is identified as causing the problem at least 6 of the 8 times (e.g., 75%), then the management system may confirm that the host is problematic (e.g., causing multiple requests to time out or causing responses to report a problem) and notify an administrator. By maintaining a set of confirmed problematic network entities (e.g., until the entities are fixed and become healthy), the management system may collect the management data much faster as the entities that cause responses to be delayed are not queried (e.g., because the entities are confirmed problematic). In this way, the performance of the management system is improved because fewer responses time out, fewer responses report a problem, or both.

When a request times out (e.g., a response is not received within a predetermined amount of time) or a response identifies at least one problem, the management system attempts to determine if an entity is causing a time out of the entire request (or causing a problem to be identified in the response). For example, the requested data may not be available for a specified node for a requested timestamp. If a batch request fails and the entity is identified in a failure record, the entity is marked as potentially problematic. Confirmed problematic entities are entities from which the management system no longer requests data to prevent data requests from timing out. If the management system determines that the entity has been identified in the failure record for M consecutive collection intervals (M>1), then the entity is confirmed problematic and is excluded from future requests. Periodically (e.g., every 6 hours, every 12 hours, every 24 hours or the like), the management system retries the confirmed problematic entities by adding them to the request to determine if one or more of the confirmed problematic entities have been healed (e.g., repaired) or if are still causing collection failures. The one or more entities previously confirmed as problematic that the management system determines have responded (e.g., they no longer cause a problem or delay the response) are removed from the set of confirmed problematic entities and the management system resumes collecting data from the one or more entities.

The management system may analyze failures to identify patterns in the failures. For example, if the management system determines that requests for a majority of VMs running on a host node (e.g., a physical server) are failing, the host node is confirmed problematic, effectively blacklisting (e.g., confirming as problematic) the entities (e.g., the VMs) executing on the host node. At periodic intervals (e.g., every 6 hours, every 12 hours, every 24 hours or the like), the management system may send a request to a single entity that is associated with the host node (e.g., the host node or one of the VMs) to determine whether any change has occurred in the health of the host node. For a network that is managed by the management system, the management system may store a hierarchical representation of the host nodes along with the VMs executed by a corresponding host node to enable the management system to determine when a majority of the VMs hosted by a host node have failed. The network may be a heterogeneous virtual machine environment that includes VMs from VMware®, Microsoft® and other VM vendors.

The management system determines what exactly is causing issues with data collection (e.g., a single node causing errors/high latency or many nodes within a sub network). The management system analyzes the gathered data to identify patterns to determine if the number of potentially problematic nodes within a sub-network is above a defined threshold. The system then decides if individual nodes, parts of, or the entire sub-network is confirmed to be problematic (e.g., blacklisted) to enable the system to manage a remainder of the network. Entities that have been confirmed to be problematic (e.g., repeatedly causing data requests to time out or report problems) are polled periodically to determine if an individual entity, parts of or the entire sub-network has returned to a normal (e.g., healthy) state and potentially removed from the confirmed problematic entities. To identify potentially problematic entities the system keeps track of the number of issues in the last X collection intervals. Nodes causing X issues over Y collections are candidates for inclusion in a set of problematic network entities. Various factors may be weighted to determine a severity of a problem. For example, collection failures may have a highest weight, while high latency may be assigned a weight in proportion to a size of the network being managed, e.g., for a network with relatively few number of nodes, a higher latency may be acceptable and so latency may have a relatively low weight. For a network with a relatively large number of nodes, high latency may have a relatively higher weight because latency may cause the collection of management data to fail (e.g., cause data requests to time out or report a problem). Errors and latency have a large effect on a management system when managing thousands of nodes.

Thus, when a management system that manages a network with thousands of VMs encounters a problem when collecting data (e.g., a time out to a request for data, a response to the request that identifies problems, etc.), the management system may repeatedly divide the request into smaller requests until a network entity that is causing the problem is identified. If the management system determines that the network entity is repeatedly causing the problem, the network entity may be confirmed as a problematic entity. The management system may periodically retry network entities that have been confirmed problematic to determine if the network entities are still causing the problem or if the network entities have returned to health (e.g., they can respond in a timely manner with the requested data or don't cause a problem to be reported in a response). For entities that have returned to health, the management system removes the entities from the set of confirmed problematic entities and resumes collecting data from the entities. In this way, the management system can quickly identify problem nodes in the network without significantly impacting data collection from healthy nodes.

FIG. 1 is a block diagram illustrating an architecture 100 that includes a management system to manage a network according to some embodiments. The architecture 100 includes a virtualization management system 102 communicatively coupled to a gateway 104.

The gateway 104 is communicatively coupled to a network (e.g., in FIG. 1, everything below the gateway 104 is considered to be the network) that includes multiple host nodes, such as a first host 106, a second host 108, up to a Pth host 110 (where P>1). The hosts 106, 108, 110 are coupled to the gateway 104 by network links. For example, as illustrated in FIG. 1, the first host 106 is coupled to the gateway 104 via first link 112, the second host 108 is coupled to the gateway 104 via second link 114, and the Pth host 110 is coupled to the gateway 104 via Pth link 116. The hosts 106, 108, 110 are coupled to networked storage devices. For example, in FIG. 1, the first host 106 is coupled to first storage 118, the second host 108 is coupled to second storage 120, and the Pth host 110 is coupled to the Pth storage 122. The storage 118, 120, and 122 may include various types of storage devices, such as, for example, hard drives, solid state drives (SSDs), another type of storage device, or any combination thereof.

The hosts 106, 108, 110 may each be capable of executing (e.g., hosting) a set of one or more VMs (typically thousands of VMs). For example, as illustrated in FIG. 1, the first host 106 executes a first set of VMs 124, the second host 108 executes a second set of VMs 126, and the Pth host 110 executes a Pth set of VMs 128. A set of VMs (e.g., one of the sets of VMs 124, 126, 128) may be managed by a hypervisor, also known as a virtual machine monitor that creates and manages the VMs. For example, as illustrated in FIG. 1, a first hypervisor 130 manages the first set of VMs 124, a second hypervisor 132 manages the second set of VMs 126, and a Pth hypervisor 134 manages a Pth set of VMs 128.

The gateway 104 includes a database 136 that includes information about the entities (e.g., the hosts 106, 108, 110, the VMs 124, 126, 128, the links 112, 114, 116, etc.) in the network. For example, the database 136 includes data 138, structure data 140, confirmed problematic entities 142, and potentially problematic entities 144. The data 138 includes data associated with the network entities that is gathered at periodic intervals. The structure data 140 includes network configuration data, such as a hierarchical structure of a hypervisor and a set of VMs hosted by a corresponding one of the hosts 106, 108, 110. The set of potentially problematic entities 144 includes a listing of network entities that have caused a problem when the management system 102 sent a request for data. A set comprises zero or more entities. A problem may be an error (e.g., network failure, hardware failure, error report, error log, or other problem) that is reported in a response or causing a response to time out. The set of potentially problematic entities 144 may also identify when the problem occurred to enable the management system 102 to determine whether to blacklist a particular entity in the potentially problematic entities 144 by adding the particular entity to the set of confirmed problematic entities 142. For example, the management system 102 may add a network entity that causes a problem X times in a row, causes X problems within a time interval Y, or transgresses another rule to the confirmed problematic entities 142. The confirmed problematic entities 142 includes a listing of network entities that have been confirmed problematic for repeatedly causing problems (e.g., with data collection), such as causing data requests to time out (or causing a response to report at least one problem). For example, if the management system 102 determines that a network entity is repeatedly causing problems, the management system 102 may blacklist the network entity by removing the network entity from the potentially problematic entities 144 and adding the network entity to the confirmed problematic entities 142. In a subsequent batch request, the management system 102 may not include the confirmed problematic entities 142 in the set of entities for which data is being requested.

In some cases, the management system 102 (or a system administrator) may adjust the time out interval (e.g., how often batch requests are sent). For example, if the batch request 148 times out after 5 minutes but not after 10 minutes, the frequency at which batch requests are sent may be adjusted to 10 minutes. To illustrate, if a significant portion of the smaller requests 164 are timing out because the SR responses 166 are arriving between 8 or 9 minutes after the batch request 148, the management system 102 may automatically (e.g., without human interaction) adjust the time interval at which the batch request 148 is sent to 10 minutes. In this example, the management system 102 is receiving responses from the network entities that were sent a data request, but not within a timely manner, e.g., the responses are being received within a time interval T but not within a time interval S. The management system 102 may increase the time interval to T (or greater than T).

The management system 102 (or the gateway 104) may maintain network configuration data that includes information identifying how the network is organized, including hierarchical relationships between entities etc. For example, the network configuration data may include the identities of the first set of VMs 124 hosted by the first host 106, etc. If the first host 106 is added to (or removed from) the confirmed problematic entities 142, the management system 102 may automatically add (or remove) the identities of the first set of VMs 124 to (from) the confirmed problematic entities 142. Similarly, the management system 102 may add (or remove) network entities from the confirmed problematic entities 142 based at least partly on the network configuration data, in addition to whether the network entities caused a data request to time out (or caused a problem to be reported in a response).

The management system 102 may display a user interface (UI) 146, such as a dashboard (or other type of interface), that provides a view of a status of the network and enables an administrator to, via user input, drill down to view the status of individuals hosts, individual sets of VMs, individual VMs, network links, storage devices, and other network entities. The status may include information regarding whether the network entity (or entities) being viewed is (are) functioning properly, error messages, analysis (e.g., a host is likely experiencing problems as more than 50% of the VMs executing on the host are not responding), other information associated with network entities, or any combination thereof. The network entities may include the hosts 106, 108, 110, the network links 112, 114, 116, the storage 118, 120, 122, one or more VMs from the sets of VMs 124, 126, 128, the hypervisors 130, 132, 134, etc.

The management system 102 may display various views of the network entities based on the data 138. To provide an up-to-date view, the management system 102 may periodically (e.g., every 5, 10, 15, etc. minutes) send a batch request 148 requesting at least a portion of the data 138. In addition, if the administrator requests (e.g., using the UI 146) to view information associated with one or more network entities, the management system 102 may request, from the gateway 104, a portion of the data 138 that is associated with the one or more network entities. In response to receiving the batch request 148, the gateway 104 may identify the requested portion of the data 138 in the database 136. If the gateway 104 determines that the requested portion of the data 138 is relatively recent (e.g., a difference between a current time and a timestamp associated with the requested portion of the data 138 is less than a predetermined amount), the gateway 104 sends a batch request (BR) response 150 that includes the requested information to the management system 102 from the database 136.

The management system 102 displays in the UI 146 at least part of the data included in the BR response 150. The gateway 104 may break down the batch request 148 and send individual requests, such as requests 152, 154, and 156, to individual ones of the entities in the network. The gateway 104 may aggregate results (e.g., results 158, 160, and 162) provided by the entities to create the BR response 150. Thus, the gateway 104 provides the BR response 150 after all the entities have replied (e.g., after the results 158, 160, and 162 have been received). However, a problem with one or more entities in the network may cause the gateway 104 to wait for at least one of the results 158, 160, or 162. A delay in receiving one or more of the results 158, 160, or 162 may cause the BR response 150 to be delayed. In some cases, the BR response may be delayed waiting for one or more of the results 158, 160, or 162 sufficient to cause the batch request 148 to time out.

A request for data (e.g., the batch request 148) is considered to time out when a response (e.g., the BR response 150) to the request is not received before a next request for data is sent. For example, if the management system 102 sends the batch request 148 every N minutes to the gateway 104, the batch request 148 times out when the BR response 150 is not received prior to a next batch request being sent N minutes after the batch request 148. To illustrate, if the management system 102 sends the batch request 148 every 5 minutes to the gateway 104, the batch request 148 times out if the BR response 150 is not received by the management system 102 within 5 minutes after the batch request 148 is sent.

If the BR response 150 identifies a problem with a network entity (e.g., misconfiguration, communication errors, etc.), or the BR request 150 times out, e.g., the BR response 150 is not received within a predetermined period of time after the batch request 148 is sent, then the management system 102 breaks up the batch request 148 into smaller requests 164 (e.g., individual requests of the smaller requests 164 ask for data for a smaller number of entities than the original batch request 148). The process of breaking up a request that causes (i) a time out or (ii) a response that includes a problem report into smaller requests is repeated until a network entity (e.g., a VM, a host, a link, a storage unit, or the like), causing the time out or the problem to be reported, is identified. For example, if the batch request 148 causes a time out, the batch request 148 may be broken up into the smaller requests 164, with one of the smaller requests 164 sent to the first host 106, another one of the smaller requests 164 sent to the second host 108, etc. In response to the smaller requests 164, the first host 106 may send a first result 158, the second host 108 may send a second result 160, at least some of the hosts 106, 108, or 110 may send responses, e.g., small request (SR) responses 166. If one (or more) of the SR responses 166 indicates a problem or one (or more) of the SR responses 166 times out, the one (or more) requests may broken up into still smaller requests and so on. For example, if the BR response 150 indicates a problem with an entity or the batch request 148 times out (e.g., the BR response 150 is not received before a subsequent batch request is sent), then the batch request 148 may be split into smaller requests 164. To illustrate, if a request to the hosts 106 and 108 times out (or causes a response to report a problem), a first smaller request may be sent to the first host 106 and a second smaller request may be sent to the second host 108. If the request to the first host 106 times out (or identifies at least one problem), a first set of smaller requests may be sent to a portion of the first set of VMs 124 and a second set of smaller requests may be sent to a remainder of the VMs. The process of breaking a request that times out or reports a problem into smaller requests may continue until individual VMs on a particular host are identified as causing data requests to time out (or the individual VMs are identified as reporting a problem). Note that only requests that time out or report a problem may be split into smaller requests. The VMs that are identified as causing data requests to time out (or reporting a problem) may be added to the potentially problematic entities 144. The VMs identified as repeatedly causing data requests to time out (or report a problem) may be moved from the potentially problematic entities 144 to the confirmed problematic entities 142.

The number of smaller requests 164 that are created based on the batch request 148 may be configurable by a system administrator (or other user). For example, a configurable divisor (e.g., 2, 4, 8, etc.) may determine how many of the smaller requests 164 are created from a request, such as the batch request 148. For example, when the configurable divisor is 4, a request that times out may be split into no more than 4 smaller requests.

The process of repeatedly breaking requests that (or report a problem) out into smaller requests may be used to identify other network entities (e.g., in addition to VMs) that are reporting a problem (e.g., network communication error etc.) or causing a data request to time out. For example, if requests to the first set of VMs intermittently time out (or report a problem), and communication errors are reported, the 1st link 112 may be identified and placed on the potentially problematic entities 144. As another example, if requests to the first set of VMs intermittently timeout (or report a problem), and storage-related errors are reported, the first storage device 118 may be identified and placed on the potentially problematic entities 144.

After an entity is placed on the confirmed problematic entities 142, the management system 102 may periodically (e.g., every 6, 12, 18, 24 etc. hours) retry the entity by including the entity in the batch request 148 or by sending an individual data request to the entity. If the batch request 148 does not time out (e.g., the BR response 150 is received before a subsequent batch request is sent) or a response to the individual data request is received and does not identify a problem, then the entity is removed from the confirmed problematic entities 142. If the batch request 148 or the individual data request times out (e.g., a response is not received before a subsequent batch request is sent) or the response identifies a problem (e.g., network communication error) then the entity remains on the confirmed problematic entities 142.

The management system 102 may use network configuration data, such as a hierarchical relationship between a set of VMs and a corresponding host node to determine which confirmed problematic network entity to retry. For example, if the confirmed problematic entities 142 includes the first host 106, the confirmed problematic entities 142 may also include the first set of VMs 124. The management system 102 may, based on the network configuration data, determine that the first set of VMs 124 are hosted by the first host 106, and periodically retry the first host 106 without retrying the first set of VMs 124. For example, if the first host 106 is not operating properly, there is a greater likelihood that the first set of VMs 124 are not operating properly. After the management system 102 receives a response to a request that includes the first host 106, the management system 102 may retry one or more VMs from the first set of VMs 124. Thus, the management system 102 may retry a host node if multiple VMs are not responding to data requests and have been confirmed as problematic (e.g., repeat offenders). If a VM reports a fault, the management system 102 may retry the host and if the host provides a timely response, the management system 102 may retry the VM.

The management system 102 may correlate the data 138 with the BR response 150 and the SR responses 166 to identify patterns. For example, if requests to hosts and VMs on a particular portion (e.g., sub-network) of the network are timing out, the management system may blacklist the entire sub-network by adding the entities included in the sub-network to the confirmed problematic entities 142. For example, if requests sent to network entities via the first link 112 are timing out, the management system may add the sub-network that includes the first host 106, the first hypervisor 130, the first set of VMs 124, and the first storage device 118 to the confirmed problematic entities 142.

Thus, the management system 102 may send the batch request 148 for data to the gateway 104. The batch request 148 may identify the individual entities from which to request data. The gateway 104 may send data requests to the entities identified in the batch request 148. For example, the gateway 104 may send data requests 152, 154, 156 to individual entities or groups of entities in the network based on the entities identified in the batch request 148. The gateway 104 may wait to receive a response from the entities from which data was requested to provide an aggregate response (e.g., the BR response 150) to the batch request 148. If a network entity has a problem (e.g., configuration error, software error, hardware problem, etc.) then the network entity may not respond to the data request from the gateway 104, causing the aggregate response (e.g., the BR response 150) from the gateway 104 to the management system 102 to be delayed. If the aggregate response is not received by the management system 102 within a predetermined time after the batch request 148 was sent, the management system 102 may consider the batch request 148 to have timed out. The management system 102 may repeatedly break a request that timed out (e.g., the batch request 148) or responses that reported a problem into smaller requests (e.g., a smaller request asks for data from a smaller set of entities than the request from which it was split) until the network entity that is not responding to data requests is identified. For example, the network entity may be identified when a data request sent to a particular (e.g., individual) network entity times out or a response to the data request identifies a problem. The management system 102 identifies the network entity as potentially problematic (e.g., on the potentially problematic entities 144). For subsequent batch requests for which the management system 102 identifies the network entity as potentially problematic, the management system 102 increments a counter associated with the network entity. If the counter satisfies a predetermined threshold, the management system 102 places the network entity on the confirmed problematic entities 144. The management system 102 may exclude confirmed problematic entities from subsequent batch requests. In this way, the subsequent batch requests may not time out (or report problems) because the network entities (e.g., the confirmed problematic entities 142) that are causing the aggregate response to time out (or cause the response to report a problem) are not sent data requests. At periodic intervals, the management system 102 may retry the confirmed problematic entities 142 by including one or more of entities from the confirmed problematic entities 142 in a subsequent batch request. If the subsequent batch request does not time out and the response does not identify problems, the one or more entities are removed from the confirmed problematic entities 142 and are included in subsequent batch requests.

Figure 2:
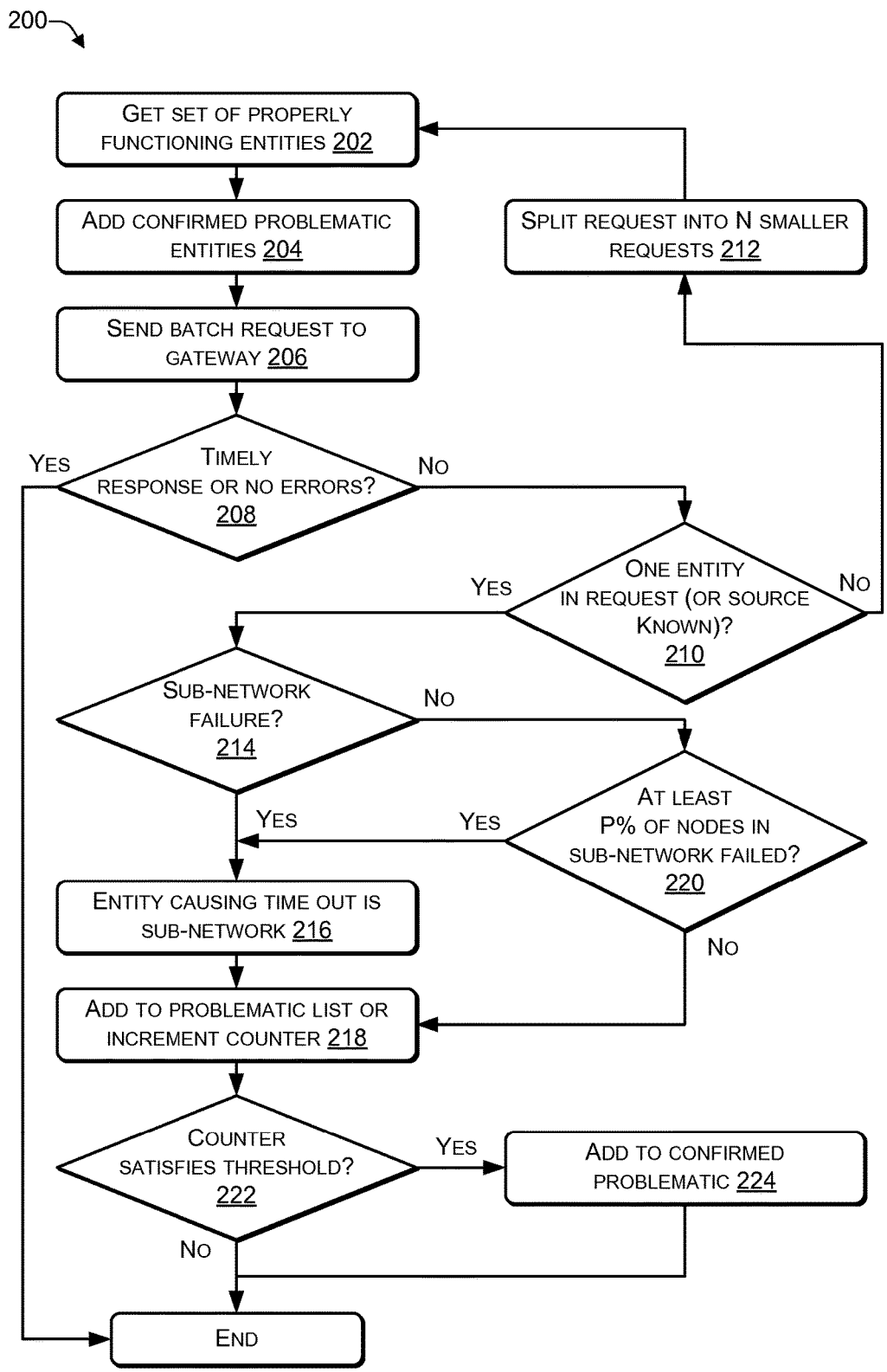
FIG. 2 is a flowchart of a process to identify an entity in a network that is causing a problem with data collection according to some embodiments.
Figure 3:
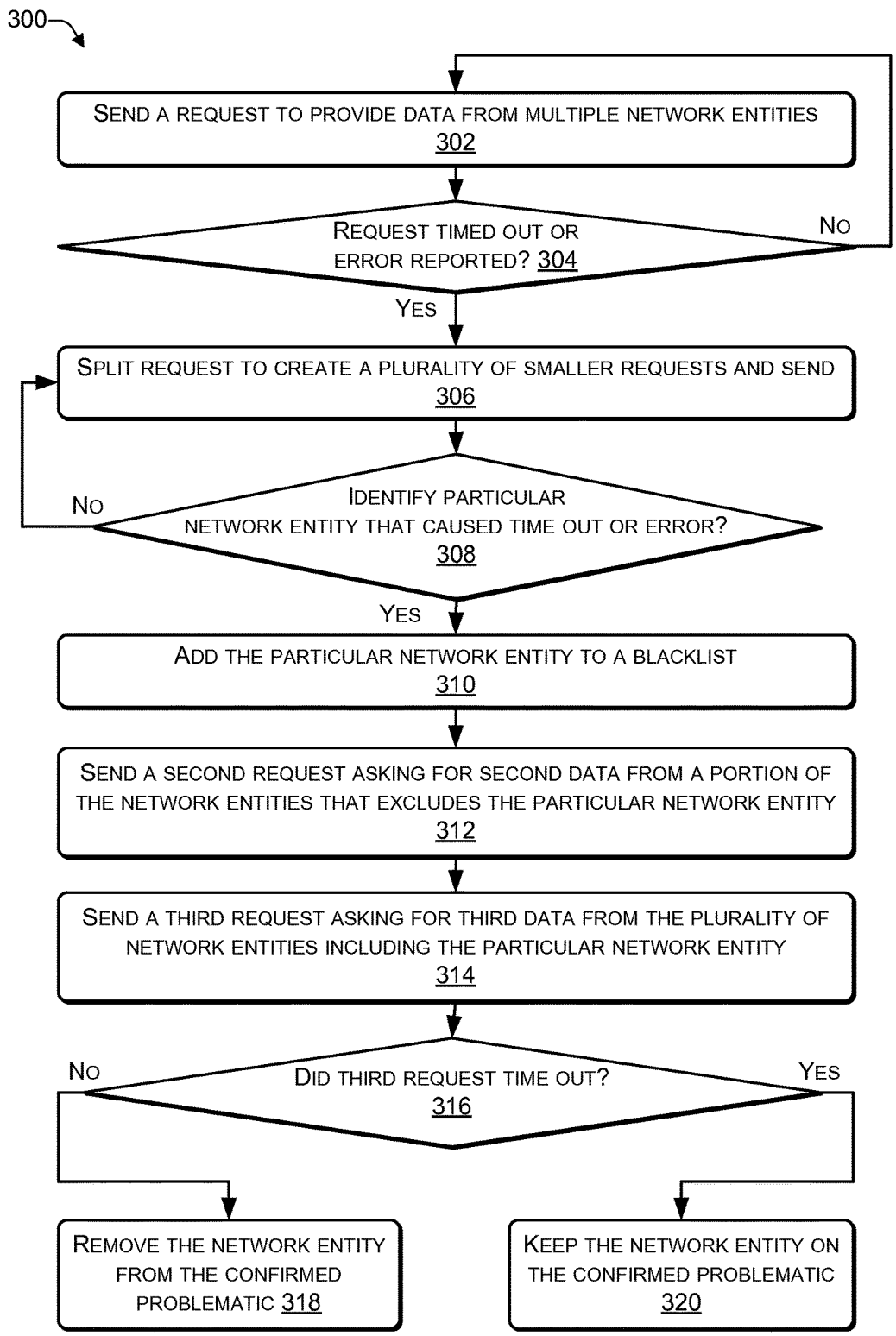
FIG. 3 is a flowchart of a process that includes identifying a particular entity that caused a request to time out (or report a problem) according to some embodiments.

In the flow diagrams of FIG. 2 and FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may implement these processes.

FIG. 2 is a flowchart of a process 200 to identify an entity in a network that is causing a problem with data collection according to some embodiments. The process 200 may be performed by the management system 102, the gateway 104, or a combination of both.

At 202, a set (e.g., a list or other data structure) of entities that are functioning properly (e.g., entities that are neither potentially problematic nor confirmed problematic) is obtained (e.g., the set of nodes from which to request data). For example, in FIG. 1, the management system 102 may maintain a set of the properly functioning entities in the network or may obtain the set from the gateway 104.

At 204, confirmed problematic entities are added (e.g., to the non-properly functioning entities) based on how long an entity has been confirmed problematic. For example, when a network entity is added to an entry in the potentially problematic entities 144 or the confirmed problematic entities 142, a timestamp indicating when the network entity was added may be included in the entry. The timestamp may be used to determine when to move a network entity from the potentially problematic entities 144 to the confirmed problematic entities 142. The timestamp of the network entities in the confirmed problematic entities 142 may be used to determine when (e.g., every 6 hours, every 12 hours, every 24 hours etc.) to retry the network entity. For example, the management system 102 may periodically retry sending a request to the network entity to determine whether the network entity has healed and is functioning properly or whether the network entity will cause a response to report a problem or cause the response to time out. The management system 102 determines when a last request for data was sent to a confirmed problematic entity and, based on a retry interval, the confirmed problematic entity is added to the functioning properly entities obtained in 202. For example, when the retry interval is 12 hours, the management system 102 identifies entities from the confirmed problematic 142 that have not been sent a data request in at least 12 hours and adds the identified entities to the functioning properly entities obtained in 202 to create a set of entities (e.g., nodes) to which data requests will be sent.

At 206, a batch request is sent to the gateway. For example, in FIG. 1, the management system 102 may create a set of entities from which to request data based at least partly on the functioning properly entities and the confirmed problematic entities. The batch request may 148 may identify the nodes for which the management system 102 is requesting data and indicate the type(s) of data that is being requested for individual network entities. For example, the management system 102 may request particular types of data based on the network view being displayed in the user interface 146.

At 208, a determination is made as to whether a response to the batch request is received or an error was reported. If a determination is made, at 208, that a timely response was received to the batch request or the response did not identify any errors (e.g., no errors were reported in the response), then the process ends. If a determination is made, at 208, that the batch request timed out or the response identified at least one error, then the process proceeds to 210. For example, in FIG. 1, after the management system 102 sends the batch request 148, if the BR response 150 is received prior to a subsequent batch request being sent, then the BR response 150 is considered timely. After the management system 102 sends the batch request 148, if the BR response 150 is not received prior to the subsequent batch request being sent, then the BR response 150 is considered to time out.

At 210, a determination is made as to whether the batch request (sent at 206) was requesting information associated with a single node or whether a source of the problem (or the source of the time out) is known. For example, responses received by the gateway 104 may include error logs (or other error-related information) that enables the gateway 104 to identify a source of the problem (or a source of a timed out request). In such cases, the gateway 104 may identify the source of the problem to the management system 102. If a determination is made, at 210, that the batch request (sent at 206) requested information associated with more than one node and that the source of the time out (or problem) is unknown, then the batch request is split into N smaller requests (N>1), at 212, and the process proceeds to 202. For example, in some implementations, a request is split into four (smaller) requests, e.g., N=4. To illustrate, in FIG. 1, if the batch request 148 times out (or the BR response 150 reports a problem), the management system 102 breaks the batch request 148 into the smaller requests 164 and send the smaller requests 164 to the network entities.

If a determination is made, at 210, that the batch request was for information associated with one node or that the source of the time out (or the reported problem) is known, then the process proceeds to 214.

At 214, a determination is made whether a sub-network failure occurred. For example, a sub-network failure may be determined when a request to an entity that is used to access other entities causes a time out (or reports a problem or an error). To illustrate, if requests to the first host 106 time out (or cause one or more responses to report a problem), then a portion of the network (e.g., sub-network) that includes the first host 106 may be determined to be experiencing a failure. As another example, an analysis of addresses (e.g., internet protocol (IP) addresses or other network addresses) of entities to whom requests have timed out (or that have reported problems or errors) may be used to determine that a sub-network failure has occurred.

If a determination is made, at 214, that a sub-network failure (e.g., caused by a problem with a network link etc.) occurred, then the entity causing the time out (or cause a response to report a problem) is identified as the sub-network, at 216. At 218, the entity (e.g., the sub-network) is added to the potentially problematic entities 144 or, if the entity is already included in the potentially problematic entities 144, then a counter (e.g., a problem counter) associated with the entity is incremented. At 222, a determination is made as to whether the counter satisfies a predetermined threshold. If a determination is made, at 222, that the counter satisfies the predetermined threshold, then the entity is confirmed problematic, at 224, and the process ends. For example, in FIG. 1, if a particular request of the smaller requests 164 times out (or a response reports a problem) and the particular request was associated with a single entity, then the single entity is either added to the potentially problematic entities 144 or, if the entity is already included in the potentially problematic entities 144, then a counter associated with the entity is incremented. If the counter associated with an entity satisfies a predetermined threshold, then the entity is confirmed problematic. For example, in FIG. 1, if a request to the first host 106 times out more than X times (where X>1) or X problems are associated with the first host 106, then the first host 106 is confirmed problematic. In some cases, the counter may be used to determine a frequency (how often something occurs within a predetermined time interval) which is used to determine whether to add an entity to the confirmed problematic 142. For example, in FIG. 1, if a request to the first host 106 times out (or causes a response to report a problem) more than X times in Y minutes, then the first host 106 is added to the confirmed problematic 142.

If a determination is made, at 214, that a sub-network failure did not occur, then the process proceeds to 220. At 220, a determination is made as to whether at least a predetermined percentage (e.g., 60%, 70%, 80%, 90%, or the like) of nodes in the sub-network failed. If a determination is made, at 220, that at least the predetermined percentage of nodes in the sub-network failed, then the process proceeds to 216, where the sub-network is identified as the entity that is causing the batch request to time out (or report a problem) and added to the set of potentially problematic entities (or, if the entity is already included in the set of problematic entities, a counter associated with the entity is incremented). If a determination is made, at 220, that the predetermined percentage of nodes in the sub-network have not failed (e.g., are active), then the process proceeds to 218, where the nodes are identified as the entities that are causing the batch request to time out (or causing a problem to be reported) and added to the set of potentially problematic entities (or, if the entities are already included in the set of potentially problematic entities, their corresponding counters are incremented). For example, in FIG. 1, the management system 102 may determine that a request to the first host 106 timed out (or reported a problem) and that the first set of VMs 124 are in good health (e.g., active). Based on this information, the management system 102 may determine that a sub-network, such as the first link 112, is the entity causing the time out (or cause a response to identify an error) and either add the sub-network to the potentially problematic entities 144 or, if the sub-network is already in the potentially problematic entities 144, increment a counter to determine whether to add the sub-network to the set of confirmed problematic entities 142. As another example, the management system 102 may determine that a request to the first host 106 timed out (or the response identified a problem) and that requests to the first set of VMs 124 either timed out or the responses identified problems. Based on this information, the management system 102 may determine the first host 106 and the first set of VMs 124 are causing the time out (or the problems reported in a response) and either add the first host 106 and the first set of VMs 124 to the potentially problematic entities 144 or, if already in the potentially problematic entities 144, increment a counter associated with the first host 106 and the first set of VMs 124 to determine whether to add them to the confirmed problematic entities 142.

FIG. 3 is a flowchart of a process 300 that includes identifying a particular entity that caused a request to time out or caused a response to identify a problem according to some embodiments. The process 300 may be performed by the management system 102, the gateway 104, or a combination of both.

At 302, a request to provide data from multiple network entities is sent. For example, in FIG. 1, the management system 102 may send the batch request 148 to the gateway 104 asking for data associated with a set of network entities identified in the batch request 148.

At 304, a determination is made whether the request timed out or the request reported a problem (e.g., communication error). If a determination is made, at 304, that the request did not time out or no problems were reported in the response, the process proceeds to 302 and, after a predetermined time interval (e.g., 5, 10, or 15 minutes), and another request to provide data from the multiple network entities. is sent If a determination is made, at 304, that the request timed out or a problem was reported in the response, the request is split into a plurality of smaller requests and the plurality of requests are sent, at 306. At 308, a determination is made whether a particular network entity that caused the request (e.g., batch request) to time out (or the response to report a problem) can be identified. If a determination is made, at 308, that the particular network entity that caused the request (e.g., batch request) to time out (or caused responses to report a problem) cannot be identified, the process proceeds to 306 and at least one of the smaller requests (e.g., that timed out or reported a problem) is split into still smaller requests. For example, in FIG. 1, if the management system 102 receives the BR response 150 within a predetermined time period and the BR response 150 does not identify a problem, then the management system 102 sends a subsequent batch request a predetermined amount of time after sending the batch request 148. If the management system 102 does not receive the BR response 150 within the predetermined time period (e.g., the BR response 150 is not received prior to the management system 102 sending a subsequent batch request) or the BR response 150 identifies at least one problem), then the batch request 148 is split into the smaller requests 164. The process of splitting requests that timed out (or reported a problem) into smaller requests is repeated until a particular network entity that caused a request to time out (or caused a problem to be reported) is identified. For example, if a smaller request identifying and requesting data from a network entity times out or the response identifies a problem, the network entity is identified as causing the request to time out or report a problem.

If the particular network entity that caused the request to time out (or caused a problem to be reported in the response) is identified, at 308, then the particular network entity is added to a confirmed problematic entities, at 310. For example, in FIG. 1, if a network entity, such as the first host 106, is identified as causing X requests to time out (where X>0) or causing X responses to report a problem, then the network entity (e.g., the first host 106) is added to the confirmed problematic entities 142.

At 312, a second request that asks for second data from a portion of the network entities that excludes the particular network entity is sent. When the management system 102 sends a subsequent batch request, the subsequent batch request excludes the confirmed problematic entities 142. The management system 102 does not include (e.g., identify) the confirmed problematic entities in the subsequent batch request to reduce the likelihood that the subsequent batch request will time out or cause a response to report a problem (e.g., by not requesting data from network entities that are non-responsive or that are causing responses to report a problem).

At 314, a third request that asks for third data from the plurality of network entities including the particular network entity is sent. At 316, a determination is made whether the third request timed out or caused a response to identify a problem. If a determination is made, at 316, that the third request did not time out (e.g., a timely response was received) and a response did to the third request not report a problem, then the network entity is removed from the confirmed problematic entities, at 318. If a determination is made, at 316, that the third request timed out (e.g., a timely response was not received) or a response reported a problem, then the network entity is kept on the confirmed problematic entities, at 320. For example, in FIG. 1, based on how long individual network entities have been confirmed problematic, the management system 102 may periodically (e.g., every 6, 12, 18, 24 hours etc.) retry some or all of the confirmed problematic entities 142. For example, if the first host 106 is included in the confirmed problematic entities 142, the management system 102 may retry the first host 106 every 12 hours by including the identity of the first host 106 in a subsequent batch request. If the first host 106 responds and the subsequent batch request does not time out and the response does not indicate a problem, then the management system may remove the first host 106 from the confirmed problematic entities 142. If the first host 106 does not respond and the subsequent batch request times out (or the response identifies an error), then the management system may keep the first host 106 on the confirmed problematic entities 142. In some cases, the management system 102 may update the timestamp associated with the first host 106 in the confirmed problematic entities 142 to indicate a last time when a data request was sent to the first host 106.

Figure 4:
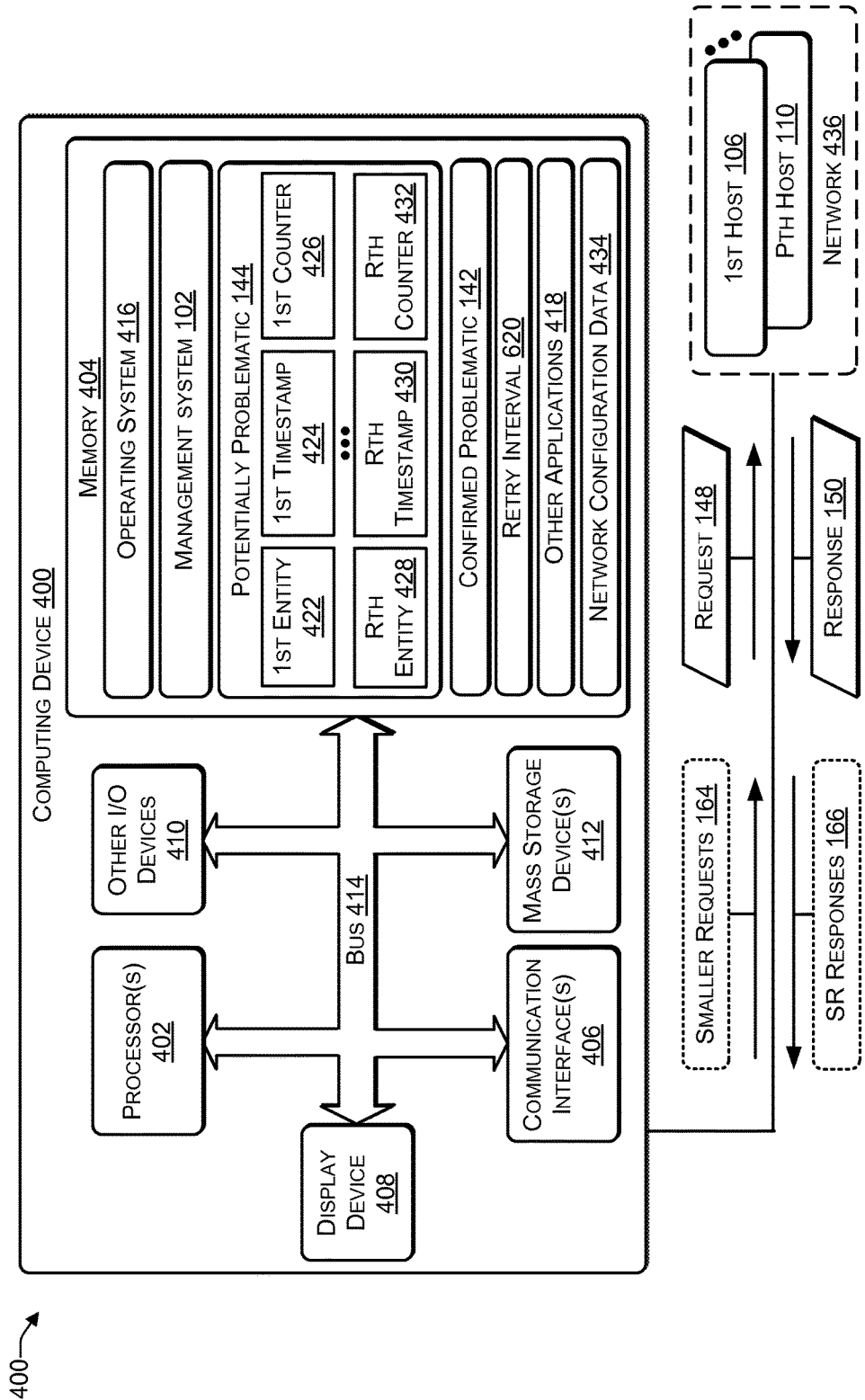
FIG. 4 illustrates an example configuration of a computing device that can be used to implement the systems and techniques described herein.

FIG. 4 illustrates an example configuration of a computing device 400 and environment that can be used to implement the modules and functions described herein. The computing device 400 may include at least one processor 402, a memory 404, communication interfaces 406, a display device 408, other input/output (I/O) devices 410, and one or more mass storage devices 412, configured to communicate with each other, such as via a system bus 414 or other suitable connection.

The processor 402 may be a single processing unit or a number of processing units, all of which may include single or multiple computing units or multiple cores. The processor 402 can be implemented as one or more microprocessors, microcomputers, microcontrollers, digital signal processors, central processing units, state machines, logic circuitries, and/or any devices that manipulate signals based on operational instructions. Among other capabilities, the processor 402 can be configured to fetch and execute computer-readable instructions stored in the memory 404, mass storage devices 412, or other computer-readable media.

Memory 404 and mass storage devices 412 are examples of computer storage media for storing instructions which are executed by the processor 402 to perform the various functions described above. For example, memory 404 may generally include both volatile memory and non-volatile memory (e.g., RAM, ROM, or the like). Further, mass storage devices 412 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein, and may be a non-transitory media capable of storing computer-readable, processor-executable program instructions as computer program code that can be executed by the processor 402 as a particular machine configured for carrying out the operations and functions described in the implementations herein.

The computer storage media, such as memory 404 and mass storage devices 412, may be used to store software and data. The software may include the management system 102, an operating system 416, and other applications 418. The data may include the potentially problematic entities 144, the confirmed problematic entities 142, and a retry interval 420. The potentially problematic entities 144 may include a first entity 422 with an associated first timestamp 424, and a first counter 426 to an Rth entity 428 (where R>1) with an associated Rth timestamp 430, and an Rth counter 432. The first timestamp 424 may be added when the first entity 422 is added to the potentially problematic entities 144. When a difference between a current timestamp and a timestamp of a potentially problematic entity, such as the first timestamp 424, is greater than the retry interval 420, the potentially problematic entity (e.g., the first entity 422) is added to the functioning properly entities for which data is requested using the batch request 148 to retry requesting data from the potentially problematic entity. One or more of the counters 426 to 432 are incremented when the corresponding one or more of the entities 422, 428 is identified as causing a batch request to time out (or causing a response to report a problem, such as a communication error). Based at least partly on the timestamps 424, 430 and the counters 426, 432, the management system 102 determines whether to move one or more of the entities 422, 428 from the potentially problematic entities 144 to the confirmed problematic entities 142. For example, if the counter 426 is X, indicating that the first entity 422 has been identified as causing a request to time out X times (or causing a response to identify a problem X times), then the management system 102 may move the first entity 422 from the potentially problematic entities 144 to the confirmed problematic entities 142 if X satisfies a threshold (e.g., X greater than a predetermined number). As another example, the management system 102 may move the first entity 422 from the potentially problematic entities 144 to the confirmed problematic entities 142 if X satisfies a threshold and a difference between a current timestamp and the first timestamp is greater than a predetermined threshold.

The memory 404 may include network configuration data 434 that identifies relationships between network entities, including hierarchical relationships. For example, the network configuration data 434 may identify which host node is executing which set of VMs, the network links on which data travels to and from host nodes, storage devices, etc. The network configuration data 434 may be used to identify additional network entities to add to or remove from the confirmed problematic entities 142. For example, if a host node is added to the confirmed problematic entities 142, the management system 102 may, based on the network configuration data 434, automatically add the set of VMs executed by the host node to the confirmed problematic entities 142.

The management system 102 may be coupled to a network 436 that includes the hosts 106, 110. The management system 102 may send a batch request 148 for data to the network 436. The BR response 150 indicates a problem or times out, the management system 102 splits the request 148 into the multiple (smaller) requests 164. Based on the multiple responses 166 to the multiple requests 164, the management system 102 may split those requests from the multiple requests 164 that timed out (or reported an error or a problem) into additional multiple requests until a single network entity is identified as causing the original batch request 148 to time out (or report a problem).

The computing device 400 may also include one or more communication interfaces 406 for exchanging data with network entities in the network 436, as discussed above. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 406 can also provide communication with external storage (not shown), such as in a storage array, network attached storage, storage area network, or the like.

A display device 408, such as a monitor may be included in some implementations for displaying information and images to users. Other I/O devices 410 may be devices that receive various inputs from a user and provide various outputs to the user, and may include a keyboard, a remote controller, a mouse, a printer, audio input/output devices, and so forth.

Memory 404 may include modules and components for managing a network and identifying network entities that are causing data requests to time out (or causing responses to report a problem) according to the implementations herein. Memory 404 may also include other data and data structures described herein, such as the potentially problematic entities 144 and the confirmed problematic entities 142. Memory 404 may further include one or more other applications 418, the operating system 416, drivers, communication software, or the like. Memory 404 may also include other data, such as data stored while performing the functions described above and data used by the other applications 418.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
    sending, from a management system, a first request to provide first data associated with a plurality of network entities comprising a plurality of host nodes, wherein individual host nodes of the plurality of host nodes each host a plurality of virtual machines;
    in response to determining that the first request timed out, creating a plurality of smaller requests based on the first request;
    sending the plurality of smaller requests, each of the plurality of smaller requests requesting data from a subset of the plurality of network entities;
    identifying a particular network entity of the plurality of network entities that caused the first request to time out based on responses to the plurality of smaller requests;
    in response to determining that the particular network entity is not included in a set of potentially problematic entities:
        adding the particular network entity to the set of potentially problematic entities; and
        associating a counter with the particular network entity;
    incrementing the counter associated with the particular network entity;
    associating a current timestamp with the counter;
    performing a first comparison of the counter with a first threshold;
    performing a second comparison of the current timestamp with a previous timestamp associated with the counter;
    based at least in part on the first comparison and the second comparison, moving the particular network entity from the set of potentially problematic entities to a set of confirmed problematic entities; and
    sending a second request to provide second data associated with a portion of the plurality of network entities that excludes the set of confirmed problematic entities.

2. The computer-implemented method of claim 1, wherein the plurality of network entities further comprises at least one of:
    a plurality of network links,
    a plurality of storage devices, or
    a sub-network comprising a portion of the plurality of network entities.

3. The computer-implemented method of claim 1, further comprising:
    sending, after a predetermined period of time, a third request to provide third data associated with the plurality of network entities including the particular network entity.

4. The computer-implemented method of claim 3, further comprising:
    in response to receiving a response to the third request, removing the particular network entity from the set of confirmed problematic entities.

5. The computer-implemented method of claim 3, further comprising:
    in response to the response to the third request timing out, maintaining the particular network entity in the set of confirmed problematic entities.

6. The computer-implemented method of claim 1, wherein the particular network entity is added to the set of confirmed problematic entities in response to determining that the particular network entity has caused a predetermined number of requests to time out.

7. The computer-implemented method of claim 1, wherein the first request:
    identifies the plurality of network entities, and
    identifies one or more types of data to request from the plurality of network entities.

8. One or more non-transitory computer-readable media, comprising instructions that are executable by one or more processors to perform operations comprising:
    sending, from a management system, a first request to provide first data associated with a plurality of network entities comprising a plurality of virtual machines hosted by a plurality of host nodes;
    in response to determining that no response to the first request was received within a predetermined time interval, splitting the first request to create a plurality of smaller requests;
    sending the plurality of smaller requests, individual smaller requests of the plurality of smaller requests requesting data from a portion of the plurality of network entities;
    identifying a particular network entity of the plurality of network entities that caused the first request to time out based on responses to the plurality of smaller requests;
    in response to determining that the particular network entity is not included in a set of potentially problematic entities:
        adding the particular network entity to the set of potentially problematic entities; and
        associating a counter with the particular network entity;
    incrementing the counter associated with the particular network entity;
    associating a current timestamp with the counter;
    performing a first comparison of the counter with a first threshold;
    performing a second comparison of the current timestamp with a previous timestamp associated with the counter;
    based at least in part on the first comparison and the second comparison, moving the particular network entity from the set of potentially problematic entities to a set of confirmed problematic entities; and
    sending a second request to provide second data associated with a portion of the plurality of network entities that excludes the set of confirmed problematic entities.

9. The one or more non-transitory computer-readable media of claim 8, wherein the plurality of network entities further comprises:
    a plurality of network links,
    a plurality of storage devices, and
    a plurality of sub-networks.

10. The one or more non-transitory computer-readable media of claim 8, further comprising:
sending, after a predetermined period of time, a third request to provide third data associated with the plurality of network entities including the particular network entity; and
in response to receiving a response to the third request, removing the particular network entity from the set of confirmed problematic entities.

11. The one or more non-transitory computer-readable media of claim 10, further comprising:
in response to the response to the third request timing out, continuing to include the particular network entity in the set of confirmed problematic entities.

12. The one or more non-transitory computer-readable media of claim 8, further comprising:
moving the particular network entity to the set of confirmed problematic entities in response to determining that the counter satisfies the first threshold.

13. The one or more non-transitory computer-readable media of claim 8, wherein the first request:
identifies the plurality of network entities, and
identifies one or more types of data to request from the plurality of network entities.

14. A computing device, comprising: one or more processors; and
one or more non-transitory computer-readable media storing instructions that are executable by the one or more processors to perform operations comprising:
sending, from a management system, a first request to provide first data associated with a plurality of network entities comprising a plurality of virtual machines hosted by a plurality of host nodes;
in response to determining that the first request timed out, creating a plurality of smaller requests based on the first request;
sending the plurality of smaller requests, each of the plurality of smaller requests requesting data from a subset of the plurality of network entities;
identifying a particular network entity of the plurality of network entities that caused the first request to time out based on responses to the plurality of smaller requests;
in response to determining that the particular network entity is not included in a set of potentially problematic entities:
adding the particular network entity to the set of potentially problematic entities;
and
associating a counter with the particular network entity;
incrementing the counter associated with the particular network entity;
associating a current timestamp with the counter;
performing a first comparison of the counter with a first threshold;
performing a second comparison of the current timestamp with a previous timestamp associated with the counter;
based at least in part on the first comparison and the second comparison, moving the particular network entity from the set of potentially problematic entities to a set of confirmed problematic entities; and
sending a second request to provide second data associated with a portion of the plurality of network entities that excludes the set of confirmed problematic entities.

15. The computing device of claim 14, wherein the network entities comprise at least one of:
a plurality of network links,
a plurality of storage devices, or
a plurality of sub-networks.

16. The computing device of claim 14, further comprising:
sending, after a predetermined period of time, a third request to provide third data associated with the plurality of network entities including the particular network entity.

17. The computing device of claim 15, further comprising:
in response to receiving a response to the third request, removing the particular network entity from the set of confirmed problematic entities.

18. The computing device of claim 15, further comprising:
in response to the response to the third request timing out, continuing to include the particular network entity in the set of confirmed problematic entities.

19. The computing device of claim 14, further comprising:
moving the particular network entity on the set of confirmed problematic entities in response to determining that the counter satisfies the first threshold.

20. The computing device of claim 14, wherein the first request comprises:
an identifier associated with each of the plurality of network entities, and
specifies one or more types of data to request from the plurality of network entities.

* * * * *